July 13, 1965   H. W. BUCHMEYER   3,194,972
TRANSISTORIZED RELAY CIRCUIT
Filed Dec. 10, 1959
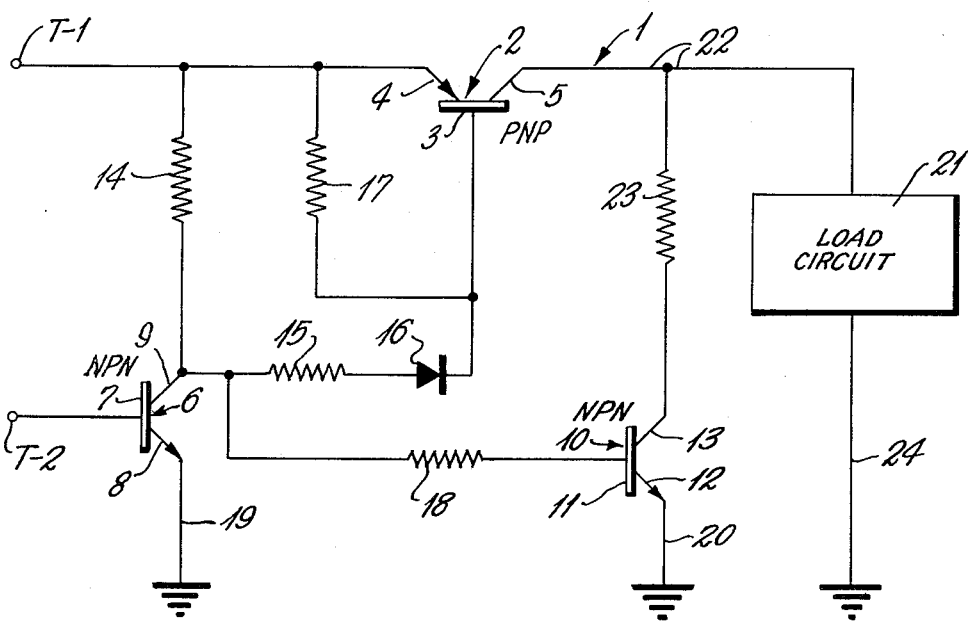
INVENTOR
*Henry W. Buchmeyer*
BY *Stevens, Davis, Miller & Mosher*
ATTORNEYS

United States Patent Office 3,194,972
Patented July 13, 1965

3,194,972
TRANSISTORIZED RELAY CIRCUIT
Henry W. Buchmeyer, Dallas, Tex., assignor to Texas Instruments Incorporated, Dallas, Tex., a corporation of Delaware
Filed Dec. 10, 1959, Ser. No. 858,614
1 Claim. (Cl. 307—88.5)

This invention relates to novel relay systems, and more particularly to the type of relay circuitry which employs transistors.

In present-day electronic instrumentation systems, it is often necessary to start and stop repetitively the flow of current through a particular type of load element. In many instances this repetitive actuation is accomplished by electromagnetic type relays or contactors.

In such prior art systems, it is known to employ mechanical type relays in which a vibratory or movable element is used to bridge a set of contacts. The operational characteristics of such mechanical type relays have long been a source of dissatisfaction to those skilled in the art. For instance, the energy of the moving element in such switch units oftentimes causes the armature member to bounce or chatter. Such bouncing gives rise to undesirable transients through the system and renders efficient operation thereof more difficult to attain. Another complicating factor in mechanical type relays is occasioned by the occurrence of arcs between the contacts bridged by the moving switch member. Arcing reduces the service life of the contacts and also results in a waste of power from the source of electric energy and, therefore, the advantage of a system capable of preventing arcing is obvious. A further disadvantage of mechanical type relays is the inherent limitation on switching time, due to the mass inertia of the device, which prevents their use in certain applications.

By the present invention, means are provided for repetitively energizing and de-energizing a load circuit without the need for tolerating the disadvantages of prior art mechanical relays. This is accomplished by utilizing a novel transistor means connected in series with the load circuit for controlling the current flow to the load. Whereas transistors have heretofore been used in relay circuits, they have only been used in combination with a mechanical type relay and as driving means therefor. By this invention, however, the transistor means are arranged to perform the actual switching operations and the need for a mechanical relay is entirely eliminated. The transistor means of this invention is capable of switching a variable load which may range from a milliampere or less to 10 or more amperes of current.

When vacuum tubes or space discharge devices are biased "off," it is well known that the resulting plate current is reduced to zero. With transistors, on the other hand, a small but measurable current flows in the collector and base electrodes even when the device is nominally biased non-conductive. This small current can be exceedingly objectionable in many types of small signal circuits, and particularly, in small signal relay circuits.

A primary example of the undesirable effects of such residual current occurs when a load is connected to the collector electrode of a plural element transistor.

When this is done, residual collector current may actually constitute a substantial portion of full collector current and therefore adversely affect the load or produce an undesirable effect.

In the apparatus of the present invention, the load circuit is isolated from residual collector current, which is present when the load circuit is de-energized by a novel low impedance shunting arrangement. In this manner, uniform performance and reliability in repetitively pulsed transistor circuits is accomplished by insuring that no residual collector current is allowed to traverse the load circuit when the transistor relaying circuit is turned "off." On the other hand, when the load circuit of the present invention draws current, all of the collector current is caused to flow therethrough by the provision for a high impedance shunt in parallel therewith.

Accordingly, therefore, a primary object of the present invention is to provide a transistor relaying circuit in which the collector current is prevented from traversing the load circuit when the circuit is switched to the "off" position.

Another object of this invention is to provide an ingenious combination of circuitry and components for repetitively energizing a particular load circuit in a manner which obviates the difficulties attendant to mechanical type relay systems.

These and other objects of the present invention will become apparent by referring to the accompanying drawing in which like numerals indicate like parts.

In this drawing, the numeral 1 has been used to indicate generally a transistor relaying circuit constructed according to the teachings of the present invention. In the left-hand portion of the illustration, there is provided an input terminal T–1 which is suitable for connection to a source of operating potential of proper magnitude and polarity. In practicing the invention, a source of 28 volts positive yielded acceptable results.

In the central portion of the drawing, the numeral 2 designates generally a p-n-p type transistor provided with a base electrode 3, an emitter electrode 4, and a collector electrode 5. It will be observed that the emitter electrode 4 is connected to receive operating potential via terminal T–1, by means of a conductor.

In the lower left-hand portion of the inventive circuitry, there is illustrated an n-p-n type transistor which is generally identified by the reference numeral 6. The transistor 6 is of conventional construction, and may include a base electrode 7, an emitter electrode 8, and a collector electrode 9. Directly to the right of the transistor 6, another conventional n-p-n transistor is generally designated by the reference numeral 10. The transistor 10 includes the usual base electrode 11, emitter electrode 12, and collector electrode 13.

Returning momentarily to the circuitry associated with the transistor 6, it will be observed that the base electrode 7 of transistor 6 is connected to receive a switching signal via terminal T–2 by means of a conductor. The collector electrode of this transistor is connected to the terminal T–1 by way of a resistor 14. This collector electrode is also coupled to the base electrode 3 of the transistor 2 by means of a resistor 15 and a Zener diode 16 which are connected in series. The base electrode 3 of transistor 2 is, in turn, tied conductively to the emitter electrode 4 by way of a resistor 17. In the approximate center of the illustrated relay circuitry, it will be seen that the base electrode 11 of the n-p-n transistor 10 is connected through a resistor 18 to the juncture between the resistors 14 and 15 referred to earlier in the detailed description. The emitters 8 and 12 of transistors 6 and 10, respectively, are tied to ground by means of conductors 19 and 20, respectively.

One terminal of load circuit 21 which is energized by the inventive circuitry is connected to draw current from the collector electrode 5 of the transistor 2. The opposite terminal of the load circuit 21 is tied to ground by way of conductor 24.

The collector electrode 13 of the n-p-n transistor 10 is connected in parallel with the load circuit to conductor 22 by way of a resistor 23.

In operation, the performance of the circuit is as follows. When a positive pulse of sufficient magnitude is applied to terminal T–2, transistor 6 becomes conductive and the collector 9 of transistor 6 drops to near ground potential. The voltage from the collector 9 is applied to the base 11 of transistor 10 causing the transistor 10 to become non-conductive. At the same time, due to the voltage drop across resistor 14, the Zener diode 16 breaks down dropping the base 3 of transistor 2 to a sufficiently low voltage to allow transistor 2 to conduct. Before breaking down, the Zener diode 16 effectively maintains the base 3 and emitter 4 of transistor 2 at the same potential thereby minimizing the leakage current flowing through transistor 2. When transistor 2 is conducting, the voltage applied to terminal T–1 is applied to the load circuit 21. No current flows through resistor 23 as transistor 10 is in the non-conductive state. With no positive voltage applied to terminal T–2, transistor 6 is non-conductive. The base 3 of transistor 2 is at a potential close to that of the emitter 4 of transistor 2, maintaining transistor 2 in a non-conductive state. Also, the base 11 of transistor 10 is more positive than the emitter 12 of transistor 10 causing transistor 10 to be in a conductive state, thus preventing the $I_{co}$ current of transistor 2 from passing through the load circuit 21 by shunting the $I_{co}$ current to ground.

As noted, when the p-n-p transistor 2 is non-conductive, a small amount of cut-off current flows in its collector circuit. This cut-off current is prevented from traversing the load circuit 21. Rather, such current traverses the transistor 10 connected in parallel with the load circuit. The collector current is forced to bypass the load circuit in this manner because the shunting transistor 10, at this time in the conductive state, presents a low impedance path to ground.

In this manner, the collector current which exists when the transistor 2 is cut off is physically prevented from disturbing the load circuit. On the other hand, when the load circuit is energized, the previously utilized shunt path is caused to offer a high impedance, and diversion of current for the load circuit is rendered impossible.

Although the invention has been stated in such full, clear and concise terms as will enable those skilled in the art to practice and understand it, it will be readily obvious that various modifications, substitutions and alterations may be made therein without departing from the spirit of the appended claim.

What is claimed is:

A transistorized relay circuit comprising:
(a) a D.C. voltage source having first and second terminals,
(b) a load having two terminals,
(c) first, second and third transistors each having a collector, an emitter, and a base,
(d) conductive means connecting the emitter and collector of the first transistor and the load in series in the named order between the first and second terminals of the D.C. voltage source,
(e) the collector and emitter of the second transistor being connected in shunt across the terminals of the load,
(f) one of the first and second transistors being of the PNP type and the other being of the NPN type, the third transistor being of the same type as the second transistor,
(g) a resistor connecting the collector of the third transistor to the terminal of the D.C. voltage source which is connected to the emitter of the first transistor, the emitter of the third transistor being connected to the remaining terminal of the D.C. voltage source,
(h) means including a Zener diode directly connecting the collector of the third transistor to the base of the first transistor, the diode being poled for conduction in its forward direction opposite to that of the base and emitter of the first transistor,
(i) resistive means connecting the collector of the third transistor to the base of the second transistor,
(j) and means for driving the base of the third transistor at two distinct levels, one corresponding to an on condition for the third transistor and the other corresponding to an off condition.

References Cited by the Examiner

UNITED STATES PATENTS

| 2,885,568 | 5/59 | Reeder | 307—88.5 |
| 2,922,051 | 1/60 | Bright et al. | 307—88.5 |
| 2,931,921 | 4/60 | Smeltzer | 307—88.5 |
| 2,933,692 | 4/60 | Meyers | 307—88.5 |
| 2,997,606 | 8/61 | Hamburger et al. | 307—88.5 |
| 3,023,323 | 2/62 | Kojalowicz | 307—88.5 |
| 3,089,962 | 5/63 | Foote | 307—88.5 |
| 3,105,924 | 10/63 | Peterson | 307—88.5 |

OTHER REFERENCES

Hunter: "Handbook of Semiconductor Electronics," McGraw-Hill, New York, 1956, Section 16, pages 23–24.

Shea: "Principles of Transistor Circuits," John Wiley, New York, 1956, page 157.

Stoner: "Semiconductors" CQ, October 1959 (pages 62–63) (page 63 relied on).

Hunter: Handbook of Semiconductor Electronics, McGraw-Hill, 1st Ed., 1956 (page 15–31 relied on).

Hurley: Junction Transistor Electronics (text), Wiley & Sons, 1958 (page 84 relied on).

ARTHUR GAUSS, *Primary Examiner.*

GEORGE N. WESTBY, *Examiner.*